United States Patent

Kopinski et al.

[19]

[11] Patent Number: 5,887,941
[45] Date of Patent: Mar. 30, 1999

[54] AUTOMOBILE UNDER-SEAT CLEANING APPARATUS

[76] Inventors: Theodore C. Kopinski; Jill T. Kopinski, both of 10119 Norman Ct., Irving, Tex. 75063

[21] Appl. No.: 976,905

[22] Filed: Nov. 24, 1997

Related U.S. Application Data

[63] Continuation of Ser. No. 709,223, Sep. 3, 1996.
[51] Int. Cl.$^6$ ...................................................... A47C 7/00
[52] U.S. Cl. ...................................... 297/182; 297/463.2
[58] Field of Search ................................ 297/182, 463.2, 297/232, 463.1

[56] References Cited

U.S. PATENT DOCUMENTS

D. 309,059   7/1990   Bledsoe .
1,663,126   3/1928   Hansen ..................................... 297/182
2,771,127   11/1956   Cole ........................................ 297/182
3,304,950   2/1967   Hubert .
4,211,447   7/1980   Di Vincenzo .
4,252,372   2/1981   Harder .................................... 297/182
4,948,195   8/1990   Sanders ................................... 297/182
5,518,309   5/1996   St. Pierre ................................ 297/182

*Primary Examiner*—Peter M. Cuomo
*Assistant Examiner*—Anthony D. Barfield
*Attorney, Agent, or Firm*—John F Bryan

[57] ABSTRACT

An automotive seat assembly is divided into separately adjustable units for front-to-rear positioning so that a gap exists between the seat cushions, or between the seat cushion and a central console. A removable receptacle placed longitudinally on the automobile floor underlies this opening and has side wall panel members confined between the seat mounting structure and the abutting structure so that items lost in the opening can be retrieved by withdrawal of the receptacle.

9 Claims, 3 Drawing Sheets

5,887,941

AUTOMOBILE UNDER-SEAT CLEANING APPARATUS

This is a continuation of copending application Ser. No. 08/709,223 filed on Sep. 3, 1996.

FIELD OF THE INVENTION

The present invention relates to apparatus for cleaning the under-seat area in automobiles comprising a longitudinally removable receptacle placed beneath the opening along abutting edges of individually adjustable automobile seat cushions, possibly divided by a central console.

BACKGROUND AND SUMMARY OF THE INVENTION

There has been an economy driven reduction in weight and size of automobiles during recent years. Related changes have included the predominance of two passenger, individually adjustable front seats over the previously popular three passenger bench seats. Such individual seats are frequently separated by a central console but, in any case, some clearance is permitted along the abutting cushion edge to allow freedom of movement for back-and-forth adjustment. This clearance also allows for passage of the seat belt attachment. The clearance width may be relatively small, but even so, it becomes a natural trap for misplaced items and miscellaneous trash, from coins to french fries. Such things migrate into the confined space beneath the seat, where nothing is truly lost, but retrieval can be difficult. A vacuum cleaner, with a nozzle attachment can reach into this space, and probably affords the best means heretofore available for cleaning of the under-seat area. A vacuum cleaner can not pick up things such as pencils, and is not at all selective, so coins go the same way as do french fries. Ultimately, some things must either be extracted with difficulty or left for the next owner.

The first object of the present invention is therefore, to provide an automotive accessory for easy retrieval of items trapped in the confined space between and beneath seats. A second object is to provide this accessory in a form generally adaptable to all common automobile divided front seat configurations, and a third object is to provide this accessory in an inexpensively manufactured form.

The present invention addresses the above objects by providing a receptacle with upwardly inclined side panels that fit within the clearance space between an adjustable seat and an abutting structure, be it seat or console and are placed so that whatever falls into the space is ultimately caught between the panels. The receptacle is preferably installed for forward withdrawal and baffling means may be provided for assistance in the retention of caught items.

DESCRIPTION OF THE DRAWINGS

The foregoing and other objects and features of the invention will be apparent from the following detailed description of specific embodiments thereof, when read in conjunction with the accompanying drawings, in which.

DETAILED DESCRIPTION OF THE PREFERRED EMBODIMENT

Figure 1:
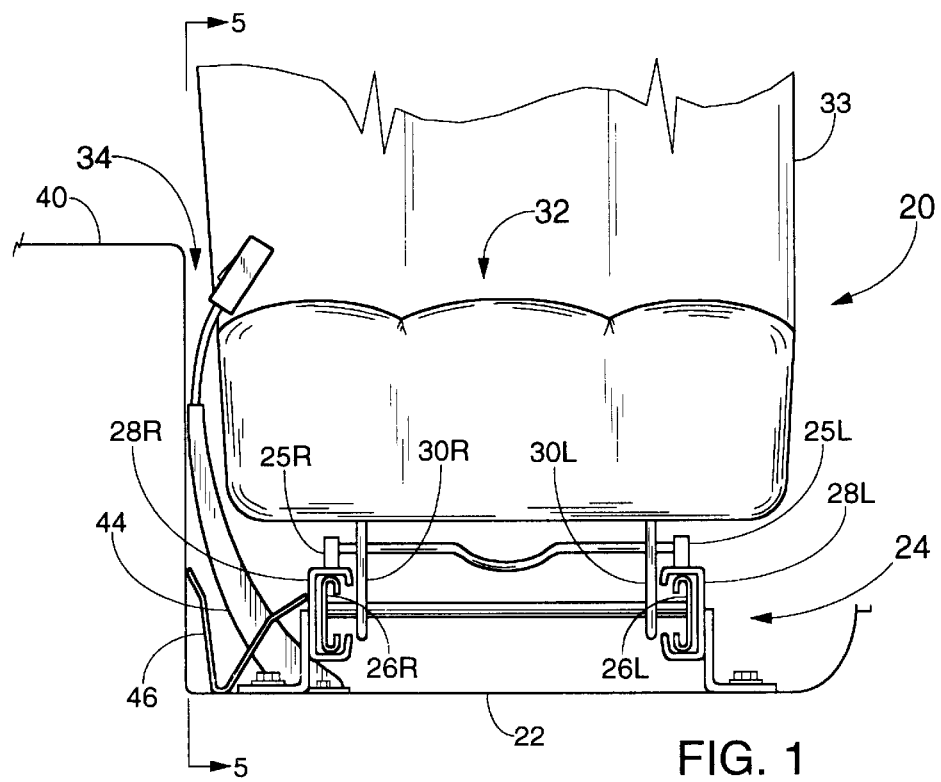
FIG. 1 is a frontal view of a preferred embodiment of the present invention in a typical installation, where the adjacent structure is a center console.

Turning now to FIG. 1, there is seen a typical automotive front seat assembly 20, comprising seat cushion 32 and seat back 33, mounted automobile floor 22 by adjustable track assembly 24. The front-to-rear seat position is adjusted by releasing latches 25R&L to allow movement of seat rails 26R&L within tracks 28R&L. Seat rails 26R&L are joined to seat frame extensions 30R&L, which structurally support seat cushion 32. Seat assembly 20 abuts central console 40, leaving gap 34 between it and seat cushion 32. Seat belt end assembly 44 is anchored to floor 22 towards the rear end of track 28R, and extends through gap 34 so as to be available for the user. Gap 34 runs longitudinally along the side of seat cushion 32 for its full length, creating a potential trap for loose change and other small items. To receive anything falling through gap 34, receptacle 46 is placed longitudinally on floor 22, under the length of gap 34, where it is confined in the space between track 28R and console 40, and in contact or near contact with both. While seat belt assembly 44 may interfere in a rearward direction, with unobstructed space in front of seat assembly 20, receptacle 46 can be readily withdrawn and replaced longitudinally, in a forward direction whenever one wishes to retrieve a lost item, or for periodic cleaning.

Figure 2:
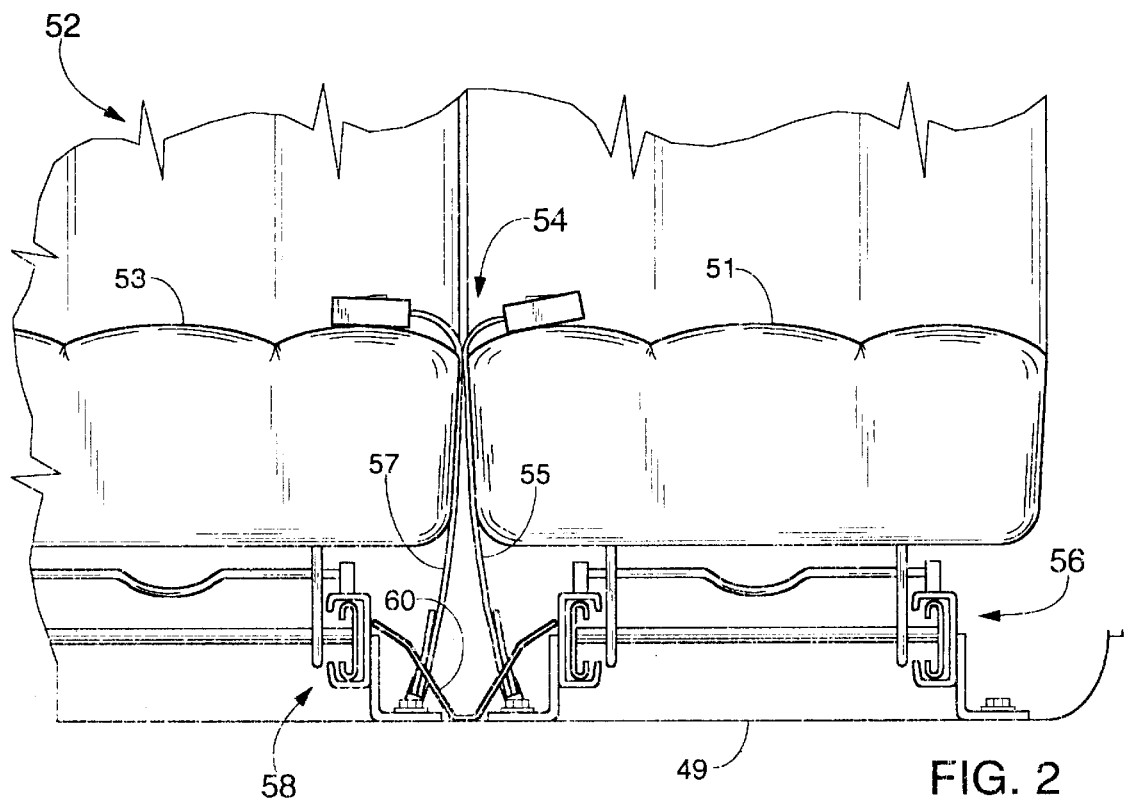
FIG. 2 is a frontal view of the preferred embodiment of the present invention in a typical installation, where the adjacent structure is another seat.

FIG. 2 shows a divided seat arrangement wherein individually adjustable seat assembly 50 abuts another similar seat assembly 52, rather than a central console as in FIG. 1. This creates longitudinal gap 54 between seat cushions 51 and 53, through which seat belts 55 and 57 extend. Seat assemblies 50 and 52 are mounted and positioned on floor 49 by track assemblies 56 and 58, identical in every way to track assembly 24 of FIG. 1.

The form of attachment of seat belts 55 and 57 to floor 49 is not specifically shown, but may be made as part of track assemblies 56 and 58 respectively, or as a separate bolted connection. Receptacle 60 is placed longitudinally adjacent to floor 49, under the length of gap 54, where it is confined in the space between track assemblies 56 and 58, and in contact or near contact with both. Receptacle 60 is withdrawn and replaced in the same way as receptacle 46 of FIG. 1.

Figure 3:
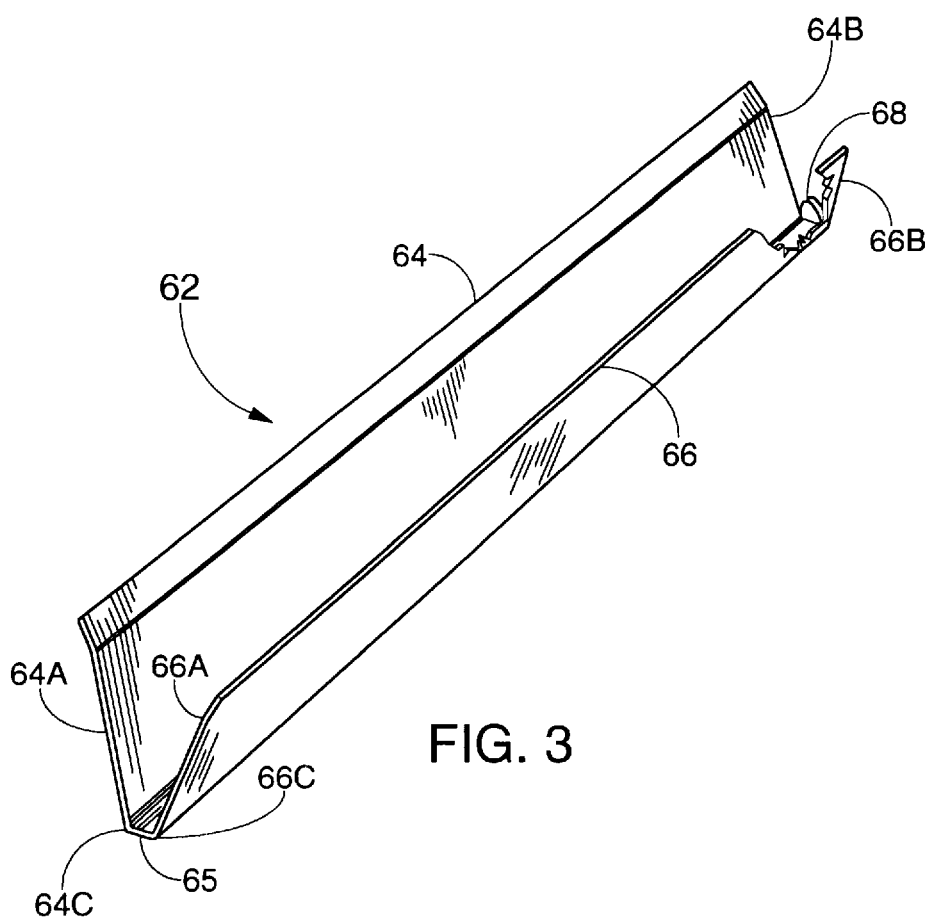
FIG. 3 is an overall view of the receptacle of the present invention as it appears prior to installation.
Figure 4:
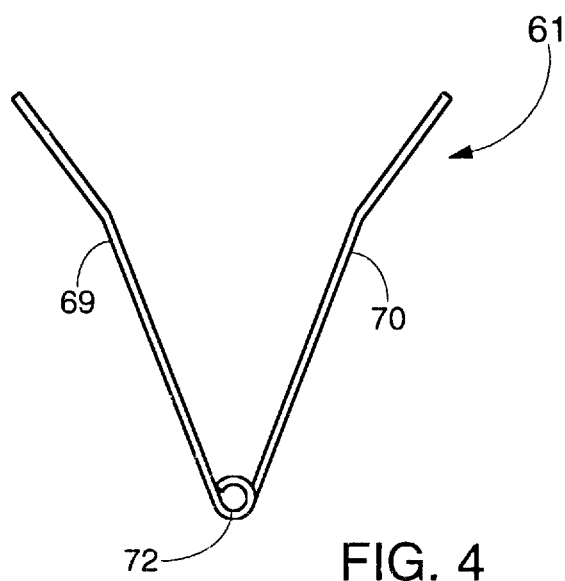
FIG. 4 is an end view showing an alternative receptacle construction.

FIG. 3 shows receptacle 62 of the present invention, generally the form of the previously discussed receptacles 46 and 60 of FIGS. 1 & 2. Side panels 64 and 66 extend from a common longitudinally extending central spine 65 and, in this embodiment, are folded along creases 64c and 66c, from a single flat piece of material. Side panel 66 is broken away to show baffle 68, which may optionally be provided as a means for inhibiting items received from migrating rearwardly out of receptacle 62. Side panels 64 and 66 are connected to central spine 65 along creases 64c and 66c respectively. Side panel front edges 64a & 66a and rear edges 64b and 66b are not constrained so that receptacle 62 is open ended. The alternative construction of receptacle 61 in FIG. 4 shows how side panels 69 and 70 might otherwise be made as separate pieces, hingedly connected along a common longitudinally extending hinge pin 72.

Figure 5:
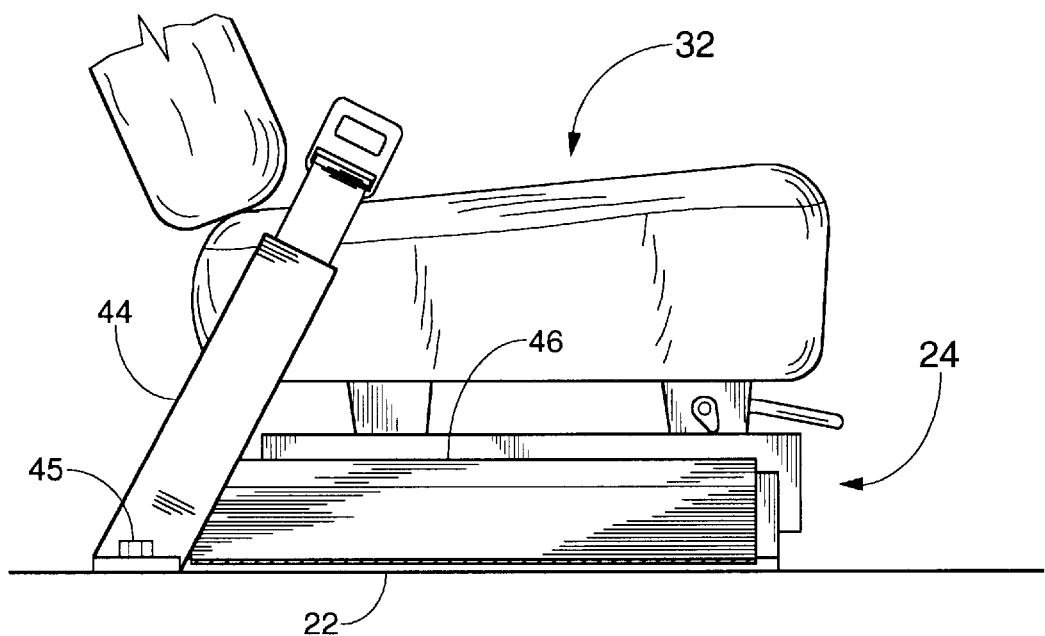
FIG. 5 is a section view taken along the plane 5—5 of FIG. 1.

FIG. 5 is a section view taken along plane 5—5 of FIG. 1, cutting through receptacle 46 to show it extending substantially along the length of cushion 32 so as to underlie the gap between it and console 40 (not seen in this view). In this embodiment of the invention, seat belt end assembly 44 is seen to be attached to floor 22 by bolt 45 and to extend between the side panels 64 and 66 of receptacle 46, however, alternative attachment means may position seat belt end assembly 44 differently.

It is to be understood that the present invention is not limited to the disclosed embodiments, and that the spirit thereof may also be expressed through a rearrangement, modification or substitution of parts.

I claim:

1. Under-seat cleaning apparatus comprising:

an automobile having right and left sides and a floor;

an automobile seat having right and left longitudinal edges;

means beneath said seat for the mounting thereof to said floor;

structure adjacent one of said right and left longitudinal edges, located so as to define a longitudinal gap between said seat and said structure;

an extended member having front and rear ends, longitudinally positioned beneath the length of said longitudinal gap at the level of said floor;

first and second opposed, side panels, each said panel being connected to said extended member along the length thereof and having unconstrained front and rear edges corresponding to the front and rear ends of said extended member, said first and second panels projecting upwardly and divergently from said extended member to near contact with said mounting means and said adjacent structure respectively, below said longitudinal gap; and means for longitudinal withdrawal of said extended member from beneath said longitudinal gap.

2. Under-seat cleaning apparatus according to claim 1 wherein said adjacent structure is a central console assembly.

3. Under-seat cleaning apparatus according to claim 1 wherein said adjacent structure is a second seat assembly including a second means for mounting thereof.

4. Under-seat cleaning apparatus according to claim 1 wherein said right and left panels are integral to, and folded from said extended member.

5. Under-seat cleaning apparatus according to claim 1 and further comprising baffle means for inhibiting longitudinal movement of items received between said right and left panels.

6. Under-seat cleaning apparatus according to claim 1 wherein said right and left panels are hingedly connected to said extended member.

7. Under-seat cleaning apparatus according to claim 6 and further comprising baffle means, adjoined said extended member, for inhibiting longitudinal movement of items received between said right and left panels.

8. Under-seat cleaning apparatus according to claim 6 wherein said right and left panels are hingedly connected to said extended member.

9. A method of cleaning beneath a longitudinal gap formed between the longitudinal edge of a seat belt equipped, floor mounted automobile seat and an adjacent structure comprising the steps of:

providing an elongated, open ended receptacle, with an extended longitudinal central member and a pair of longitudinal side panels extending upwardly and divergently therefrom and said panels having unconstrained front and rear edges;

inserting said receptacle longitudinally beneath the length of the gap between the seat and the adjacent structure so that the seat belt passes between said upwardly extending side panels;

receiving items that drop through said gap between said upwardly extending side panels; and longitudinally withdrawing said receptacle to remove said items.

\* \* \* \* \*